United States Patent [19]

Fox et al.

[11] 3,747,067

[45] July 17, 1973

[54] METHOD AND APPARATUS FOR DATA TRANSMISSION

[75] Inventors: Duane C. Fox, Fullerton; Richard Y. Ichinose; Tal E. Klaus, both of Placentia, all of Calif.

[73] Assignee: American Multiples Systems, Inc., Anaheim, Calif.

[22] Filed: Aug. 30, 1971

[21] Appl. No.: 176,228

[52] U.S. Cl. ........................ 340/147 SY, 178/69.5 R

[51] Int. Cl. ........................ H04b 1/16, H04q 1/00

[58] Field of Search ........................ 340/147 SY, 170, 340/146.1 C, 146.1 D, 163; 179/15 BS; 178/69.5 R

[56] References Cited

UNITED STATES PATENTS

| | | | |
|---|---|---|---|
| 3,335,227 | 8/1967 | Jackel | 340/150 |
| 3,478,318 | 11/1969 | Rorholt | 340/147 X |
| 3,551,816 | 12/1970 | Paine | 340/146.1 D |

OTHER PUBLICATIONS

IBM Technical Disclosure Bulletin, "Data Acquisition and Distribution System" J. G. Brenza Vol. 13, No. 9 February, 1971, pg. 2523, 2524.

*Primary Examiner*—Donald J. Yusko
*Attorney*—Harris, Kern, Wallen & Tinsley

[57] ABSTRACT

Method and apparatus for multiplex data transmission wherein binary control messages and a corresponding clock signal are transmitted from a central station through two transformer circuits to a plurality of remote terminals for control and monitoring of parameter points. A binary response message is transmitted from a remote terminal through a third transformer circuit back to the central station where a preset synchronous decoder converts the message from biphase waveform to non-return-to-zero waveform, and also generates a corresponding clock signal. A preset pattern recognition circuit assures word synchronization and a filter eliminates noise interference in the binary messages. Audio intercommunication simultaneous with the binary message transmission is provided through the transformer circuits.

14 Claims, 12 Drawing Figures

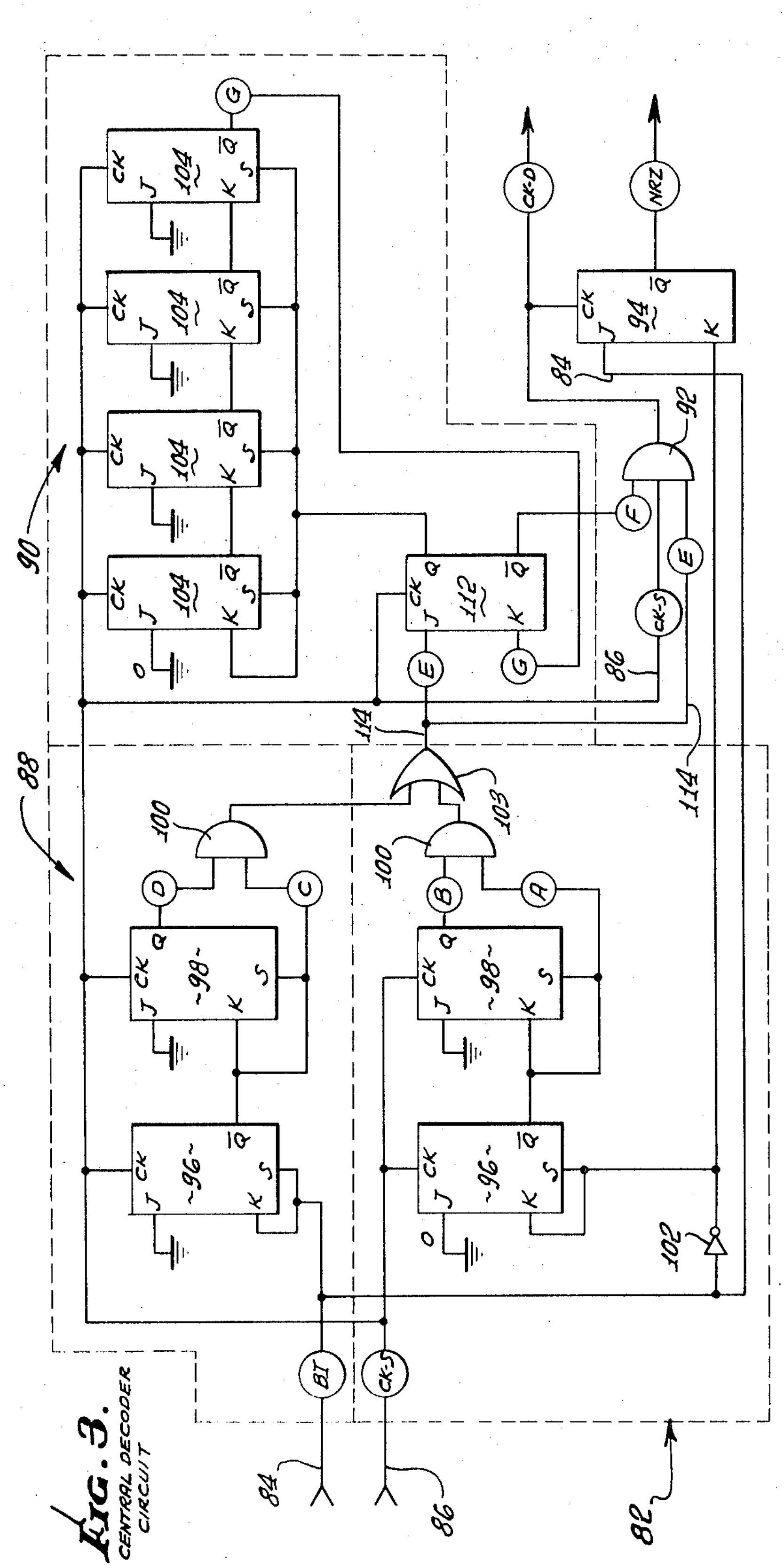
FIG. 3.
FIG. 7. WORD SYNCH BLOCK DIAGRAM
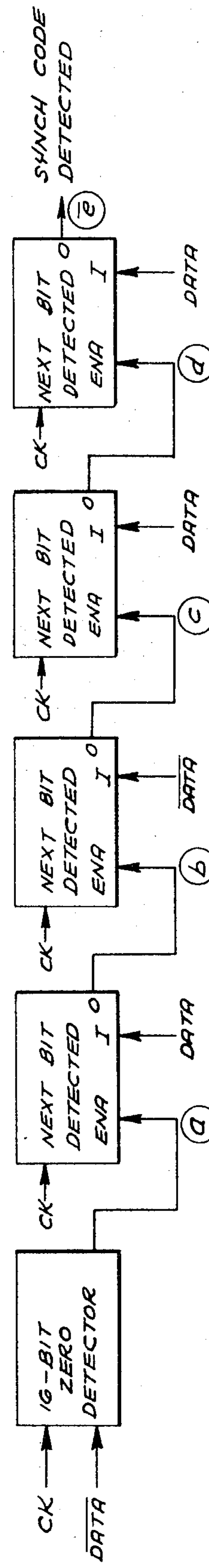

METHOD AND APPARATUS FOR DATA TRANSMISSION

This invention relates generally to multiplex digital data transmission systems, and particularly to a system incorporating a central station connected through a three-pair cable to a plurality of remote terminals for control and monitoring of parameter points at the terminals.

The general advantages of multiplex digital data transmission systems are discussed in Reprint No. 949 from "Control Engineering" written by Richard L. Aronson and entitled "Line-Sharing Systems for Plant Monitoring and Control" and include the capability of monitoring and controlling hundreds and thousands of parameter points through shared circuits connecting each of the points with a central station, thereby substantially eliminating wire costs and cable congestion. However, many of the prior art systems of this character are unduly expensive, complicated, and inefficient, and sometimes prone to inaccuracies.

Accordingly, it is a primary object of the present invention to take advantage of the operational benefits inherent in a multiplex system while at the same time providing a simplified, inexpensive, accurate, efficient, and flexible method and apparatus to achieve the automation of complex heating and air conditioning systems, security systems, fire detection systems, process control systems, pollution control systems, medical monitoring, and the like.

More specifically, it is an object of the invention to provide a method and apparatus for generating, encoding, and transmitting from a central station through a time-shared transformer circuit a train of serial binary coded biphase control message signals to respective remote terminals, and for generating, encoding, and transmitting a response message through another time-shared transformer circuit back to the central station.

Another object of the invention is to provide a method and apparatus of the aforementioned characteristics wherein word and bit synchronization is assured at each central station and remote terminal. In this regard, it is an object of the invention to include an additional transformer circuit for transmitting a clock signal from the central station to each remote terminal to assure bit synchronization, and to include a preset word synchronization circuit at the central station and each remote terminal for recognizing a predetermined synchronization frame at the beginning of each coded binary message.

It is a further object of the invention to provide a multplex transmission system which provides audio intercommunication between the central station and each remote terminal over two of the transformer circuits without interfering with the concurrent transmittal of biphase data signals through the same transformer circuits.

An additional object of the invention is to provide a system of the foregoing character which includes a preset synchronous digital circuit for decoding a binary coded message from a biphase waveform into a non-return-to-zero waveform and generating a data clock signal for use in processing the data message.

Another object is to provide each remote terminal of the aforementioned system with a filter circuit or eliminating ambiguous fluctuations of signals caused by noise interference and the like generated during asynchronous decoding at the remote terminal.

A further object is to provide a data word adaptable for use in the aforementioned system which is capable of carrying discrete and analog data in a binary message at the same time.

Further purposes, objects, features, and advantages of the invention will be evident to those skilled in the art from the following description of the preferred embodiment of the invention.

In the drawings:

FIG. 3 is a circuit diagram of a decoder of the central station of FIG. 1;

FIG. 7 is a block diagram for FIG. 5;

Generally speaking, the invention provides a method of digital data transmission between a central station and a plurality of remote terminals which utilizes time-shared multiplexing of various circuits in the central station and remote terminals as well as time-shared multiplexing of the transmission lines connecting them. Binary control messages are initiated at the central station, encoded and transmitted through a first transmission line 20 to each of the remote terminals which receive and process the message. The particular remote terminal to which the message was addressed then generates a response message which is encoded and transmitted through a second transmission line 22 back to the central station for decoding and processing. If the response indicates the need for further immediate monitoring and/or control at any parameter point of a remote terminal, the system can provide manually or by predetermined program for repeated control messages to be sent to that same destination or any other destination, thus providing random access to the various parameter points in the system. Within certain maximum capabilities of a particular embodiment, it is therefore possible to add or delete remote terminals and/or parameter points without interfering with the normal operation and circuitry of the system. In this regard, each of the remote terminals is attached by party-line connection (i.e., parallel circuit connections) to the transmission lines 20, 22 to assure optimum system flexibility and to enable each remote terminal to operate independently.

A third transmission line 24 is connected in parallel with each of the remote terminals and carries a clock signal from the central station to the remote terminals to assure proper bit synchronization during manipulation and processing of the binary control message at the remote terminals. Random audio intercommunication between the central station and the remote terminals is provided by common mode through the first and third transmission lines 20, 24 without interfering with the concurrent transmission of the binary control messages and the clock signals, respectively, in differential mode through the same first and third transmission lines (See FIG. 2). Word synchronization is assured at the central station and remote terminals by including a predetermined pattern as the initial frame of the binary control and response messages which is recognized by an improved digital logic circuit (See FIGS. 5–7).

Figures 4, 8, 9:
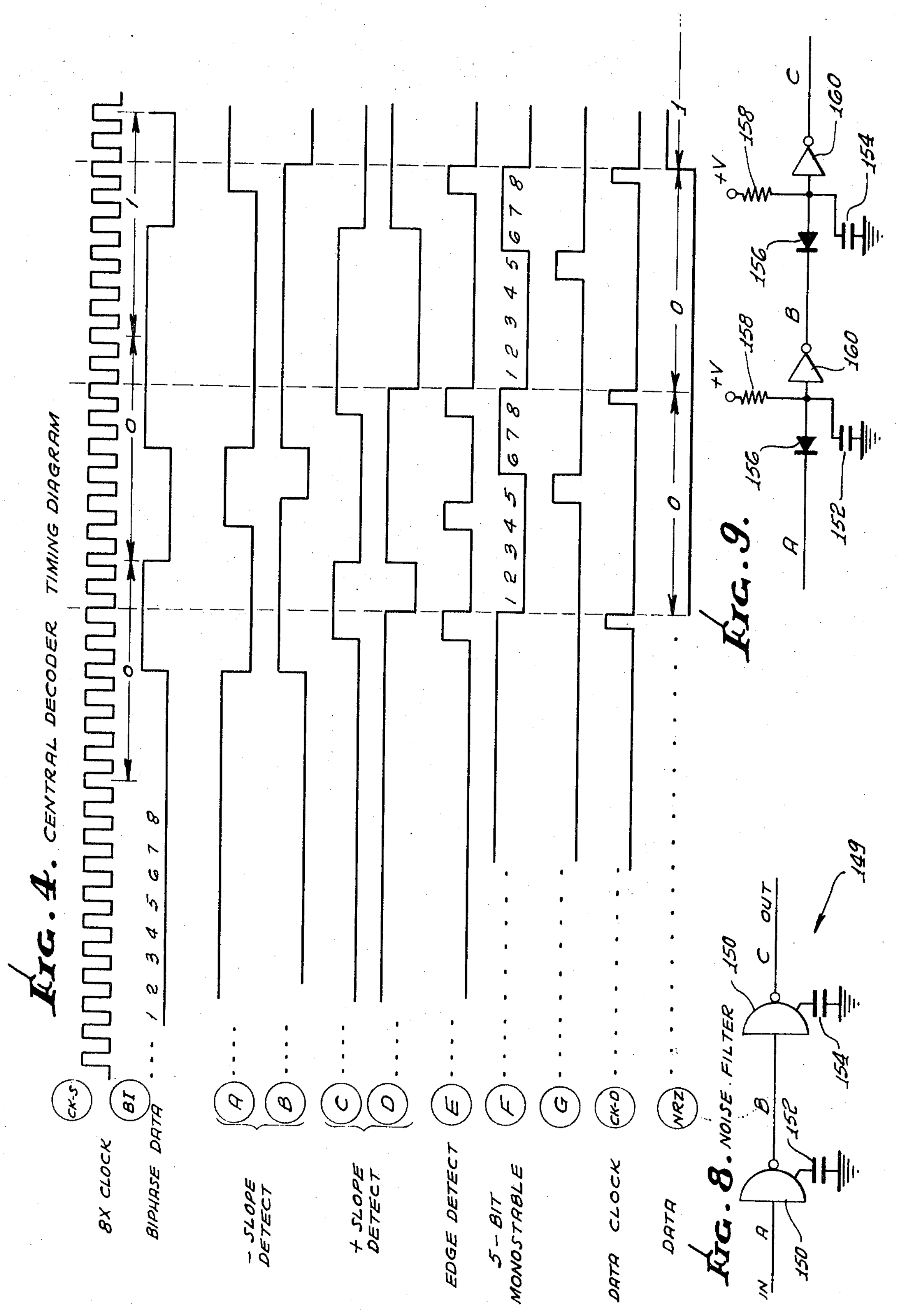
FIG.4 is a timing diagram for FIG. 3.
FIG. 8 is a circuit diagram of a noise filter of the remote station of FIG. 1.
FIG. 9 is a detailed circuit diagram of FIG. 8.
Figure 10:
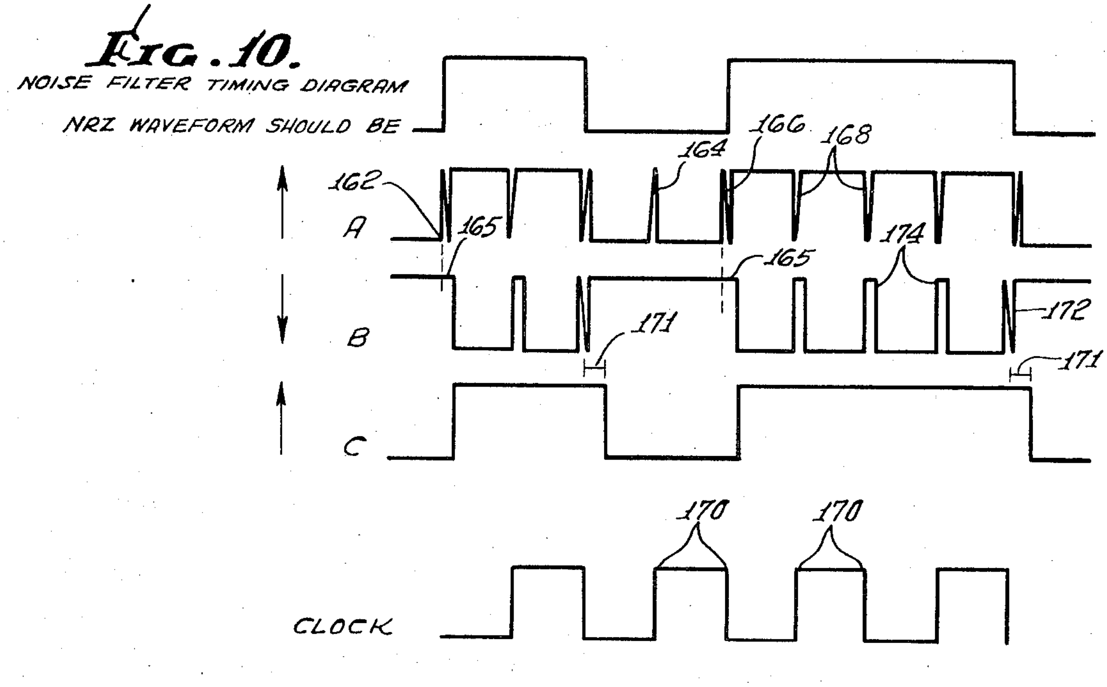
FIG. 10 is a timing diagram for FIG. 8.

To assure accurate reception and processing of the binary control message, an improved filter circuit is provided at the remote terminals after an asynchronous decoder to eliminate noise and undesirable ambiguous fluctuations of the incoming decoded signal (See FIGS. 8–10). The incoming signal at the central station is decoded from a biphase waveform to a non-return-to-zero (NRZ) waveform by a synchronous digital logic circuit which also generates a corresponding clock pulse for use in processing the binary response message at the central terminal (See FIGS. 5 and 6).

Figure 1:
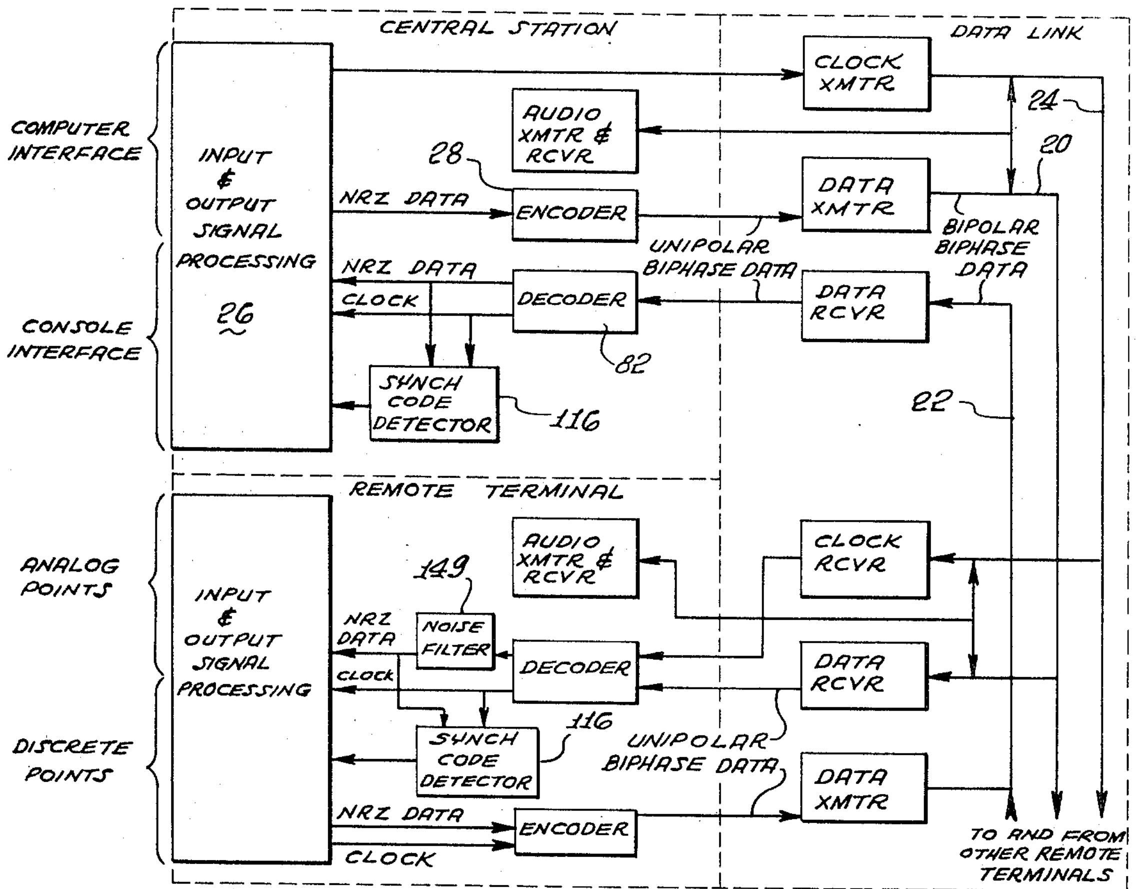
FIG. 1 is a block diagram showing a multiplex digital data transmission system incorporating presently preferred embodiment of the invention.
Figure 2:
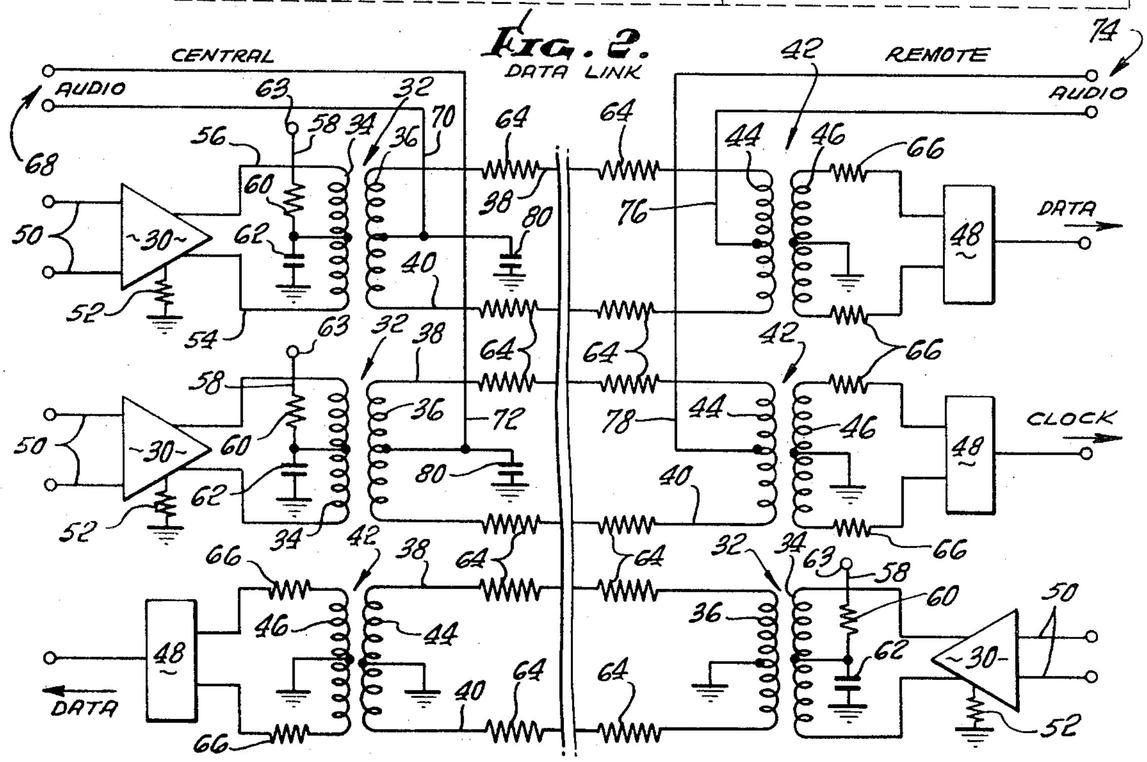
FIG. 2 is a circuit diagram for the data link portion of FIG. 1.

Referring more particularly to FIGS. 1 and 2, the system includes an interface at the central station for either a computer, hardwired console, or the like and includes various input and output signal processing which is indicated at 26. The binary control message is initially in NRZ waveform, and is encoded by conventional means 28 into a unipolar biphase waveform and connected as an input into a digital differential driver unit 30. In the illustrated embodiment, all biphase waveforms are considered to be of the type where a transition occurs in the middle of each bit cell to indicate by its direction whether it represents a binary one or zero.

The data link between the central station and the remote terminals through the first transmission line 20 includes the digital driver unit 30, a central transformer 32 with primary and secondary coils 34 and 36, a shielded twisted two-wire line 38 and 40, a remote transformer 42 with primary and secondary coils 44 and 46, and a digital differential comparator unit 48. The digital driver unit 30 has a biphase waveform input at 50, is grounded through a biasing resistor 52, and has output lines 54 and 56 connected to opposite ends of the primary coil 34 of the central transformer 32. The primary coil 34 is center-tapped to line 58 between a filter resistor 60 and filter capacitor 62 supplied by voltage 63. The two-wire line 38, 40 includes buffer resistors 64 and connects the secondary coil 34 of the central transformer 32 with the primary coil 44 of remote transformer 42, which in turn is coupled through the secondary coil 46 and through biasing resistors 66 to the comparator unit 48.

The data link for the second transmission line 22 (except the positions are reversed) and for the third transmission line 24 is substantialy the same as for the first transmission line 20, and the elements therefore bear the same identification numbers in all three instances.

The audio data link includes a central receiver-transmitter 68 having lines 70 and 72 for center-tapping the secondary coils 36 of both central transformers 32 and a remote receiver-transmitter 74 having lines 76 and 78 for center-tapping the primary coils 44 of both remote transformers 42. The lines 70 and 72 are each grounded through a capacitor 80.

For transmission purposes, the binary messages are converted into bipolar biphase waveforms. In this regard, the differential drivers 30 provide an oscillating current through the primary coil 34 of transformers 32 such that the direction of current identifies a binary high or low. The voltage difference across the primary coil induces corresponding oscillating current in the secondary coil which passes through primary coil 44 to induce a corresponding oscillating current in secondary coil 46 which is sensed and transformed back to conventional unipolar biphase waveform by the digital differential comparator unit 48. This circuit design has the advantages of transformer isolation, thus eliminating the possibility of a malfunction in a remote terminal circuitry from adversely affecting the rest of the system. In addition, the line is balanced and tends to reject common mode noise, particularly by having lines 20, 22, and 24 in the form of a twisted shielded pair. Ground loop problems are also substantially eliminated since there is no reason for the separate portions of the data link to have a common ground.

The transformer circuit design is also particularly suited to concurrent transmittal of audio messages since the current coming from either of the audio transmitters 68 or 74 passes equally through line 38 and 40. Thus, any current induced in one leg of secondary circuit 4 by the audio current is cancelled by current induced in the opposing direction in the other leg. Thus, the transmission of audio messages in common mode along transmission lines 20 and 24 does not interfere with the concurrent passage of biphase signals in differential mode through the same lines. Any two of the three transmission lines 22, 24, and 26 can be used in this manner for audio intercommunication between the central station and the remote terminals.

The data link of the system is simplified by eliminating the need for a data clock signal from the remote terminals back to the central station. However, this creates the need for an improved central station decoder for converting the incoming binary response message from biphase waveform back into NRZ waveform, while at the same time generating a corresponding clock signal for use in processing the binary response message. In this regard, reference is made to FIGS. 3–4 wherein a central decoder circuit 82 provides digital synchronous decoding and includes a data input line 84 carrying a binary message in biphase waveform, a sampling clock input line 86, an edge detector circuit 88, a five-bit monostable circuit 90, an And logic gate 92 for generating a data clock signal, and an output flip-flop 94 for generating a binary message in decoded NRZ waveform. The frequency of the sampling clock line 86 is a multiple of the intended frequency of the data clock signal generated at logic gate 92 to facilitate the decoding, and in the exemplary form is eight times the data clock frequency.

The edge detector circuit 88 includes first and second flip-flops 96, 98 with an And gate 100 for detecting positive slope changes (i.e. 0) in the incoming NRZ waveform. The J inputs of both flip-flops are grounded with the first flip-flop 96 having both its K and Set inputs connected from the data input line 84, and having its $\bar{Q}$ output connected to the K and Set inputs of the second flip-flop 98 and also connected as one input to the And gate 100. The Q output of the second flip-flop 98 provides the other input to the And gate 100. Identical elements identified by the same numbers are connected in the same way to form a logic circuit for detecting negative slope changes (i.e., 1) in the incoming NRZ waveform, except that the incoming data is first passed through an inverter 102 before passing to the first flip-flop. The outputs from both And gates 100 provide the inputs for an Or gate 103.

The five-bit monostable circuit 90 includes four identical flip-flops 104, 106, 108, and 110 successively positioned with Set inputs commonly connected to the K input of the first flip-flop 104, and with all the J inputs grounded. The $\bar{Q}$ outputs are each connected to the K input of the following flip-flop, with the last $\bar{Q}$ output connected to the K input of a control flip-flop 112. The J input of the control flip-flop 112 is connected from an output line 114 from the Or gate 103 of the edge detector circuit 88, with the $\bar{Q}$ output connected as one of three inputs to the logic gate 92 for generating a data clock signal. The other two inputs to the logic gate 92 are cnnected from the sampling clock input line 86 and the output line 114 of the edge detector circuit. The sampling clock line is connected to the following previously identified flip-flops 96, 98, 104, 106, 108, 110, and 112 in the central decoder circuit 82.

The output flip-flop 94 for generating a binary message in decoded NRZ waveform is clocked by the output of logic gate 92, with its J input connected directly from the data input line 86 and its K input connected from the data input line through the inverter 102.

The operation of the central decoder circuit 82 is best understood by reference to the timing diagram of FIG. 4 wherein the first portion 001 of a binary message is shown on the second line as an input in biphase waveform and on the last line as an output in NRZ waveform. The binary coded message of the data input line 84 is always preceded by at least eight sampling clock periods at the 0 level before the biphase waveform arrives for decoding. This initial succession of 0 pulses can be generated while the addressed remote terminal is completing its data processing, and serves to preset the edge detector circuit 88 and the five-bit monostable circuit 90 without the need of any other presetting pulse code. The letter identifications of FIG. 4 correspond to matching letters at different critical points in the circuitry of FIG. 3. It will be noted that whenever the output of the edge detector circuit 88 and the five-bit monostable circuit are high together, a data clock pulse is generated from the And gate 92 for clocking the data out of output flip-flop 94 in NRZ waveform. Since the central decoder circuit 82 was preset in the manner indicated, the data clock will always clock out the data from the biphase waveform during its second half. The second half of the type L biphase waveform in this preferred embodiment is high for a binary 0 and low for a binary 1, thus requiring that the K input for the output flip-flop 94 come from the data input line 84 through the inverter 102.

The data processing time expended at the remote station is also useful for presetting a word synchronization circuit 116 at the central station, and similarly, the data processing time expended at the central station is used for presetting identical word synchronization circuits 116 at each of the remote terminals. In both instances, a predetermined pattern in the first frame of a binary message is sensed to assure proper word synchronization when the binary messages are processed.

The word synchronization circuit 116 (See FIG. 5) includes a 16 bit zero detector 118, and four individual bit detectors 120, 122, 124 and 126. The sixteen bit zero detector 118 is clocked by data clock line 128, and a NRZ data line 130 connects through an inverter 132 to the Set input of a 16 bit counter element 133. The C and D outputs of the counter element 133 are inputs to Nor gate 134, and the A and B outputs are inputs to Nor gate 136, both Nor gates having a common output line 138. A flip-flop 140 has line 138 as the J input, with the K input coming from the data input line 130. Thus, the counter element 133, Nor gates 134, 136 and flip-flop 140 together constitute the 16 bit zero detector 118.

Flip-flops 142, 144, 146, and 148 and their associated Nor input gates 141, 143, 145, and 147, respectively, constitute the four individual bit detectors 120, 122, 124, and 126. These flip-flops are clocked by line 128, with each K input coming from the $\bar{Q}$ output of the previous flip-flop, and each J input coming from the associated Nor gate. Each Nor gate 141, 143, 145, and 147 has an inverted data line input from 132 and another input the $\bar{Q}$ output of the previous flip-flop, except that flip-flop 144 has regular data line 130 as the data input to its associated Nor gate 143.

Figures 5, 6:
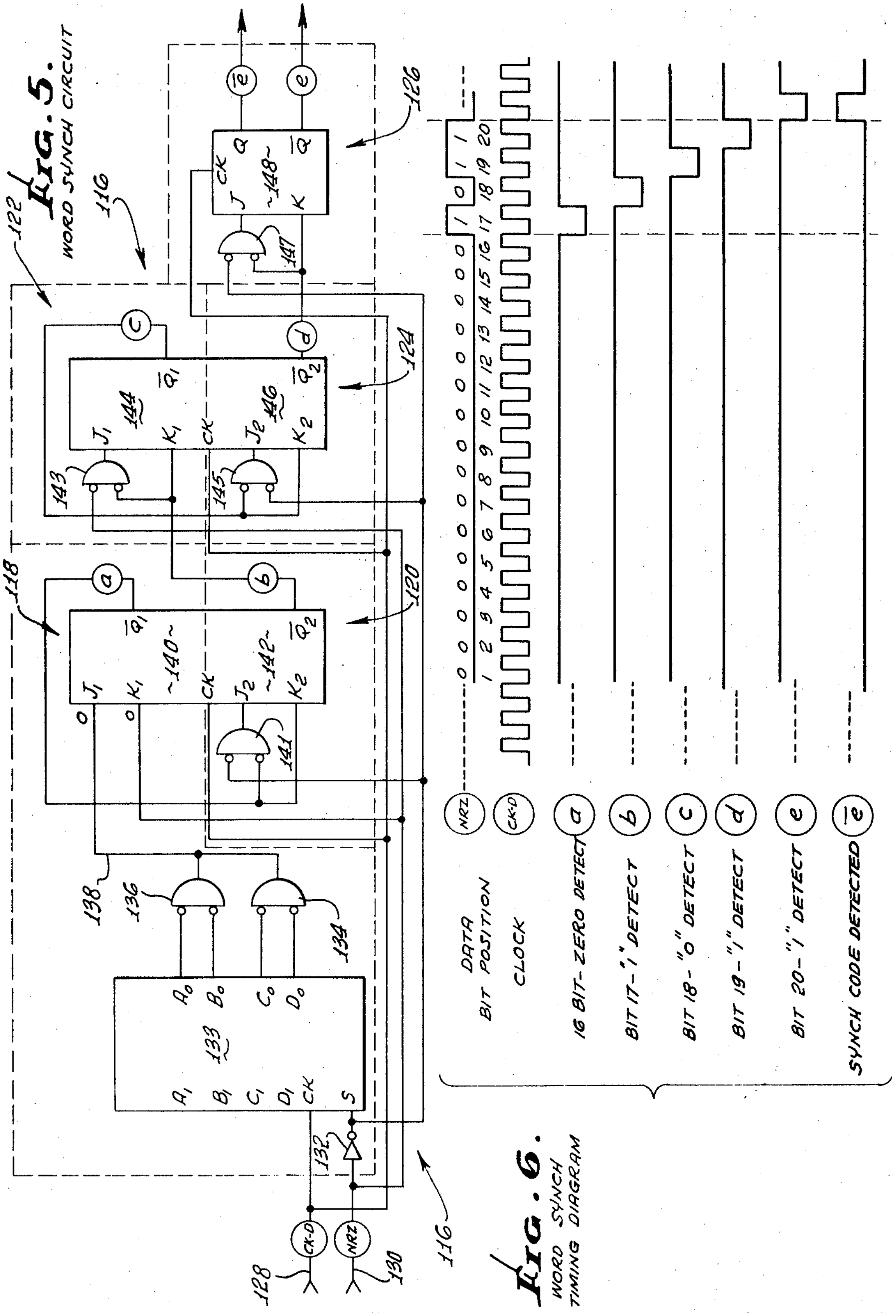
FIG. 5 is a circuit diagram of a synchronizing code detector of the central station and remote terminals of FIG. 1.
FIG. 6 is a timing diagram for FIG. 5.

The manner of operation is illustrated by reference to the timing diagram of FIG. 6 and the block diagram of FIG. 7, both of which use reference letters to identify important points in the circuitry of FIG. 5. The receipt of any 1 bit in line 130 produces an 0 Set input to intialize the counter 133 with A, B, C, and D outputs showing the binary number 0001. An 0 input in line 130 produces a Set input of 1, thereby allowing the counter to commence counting input bits so long as only zero inputs continue. During the course of counting, a 1 output from only one of the gates 134 or 136 is not sufficient to overcome the pulse-deterrent action of the collector in the other gate. However, when 16 zero bits are counted, outputs A, B, C, an D provide the necessary four zeros to produce a 1 in line 138. Considering now flip-flp 140, the high J input from line 138 and the low K input of the sixteenth bit from the data line 130 produce a low $\bar{Q}$ output during the next pulse as confirmation of the sixteenth zero bit. Each of the remaining flip-flops 142, 144, 146, and 148 have $\bar{Q}$ outputs similarly held high until the appropriate bit is sensed. Thus, each low output from $\bar{Q}$ of flip-flops 140, 142, 144, and 146 provides an "enabling" input ENA (See FIG. 7) which enables the successive flip-flop to confirm that both the previous succession of bits and the current bit correspond to the predetermined synchronizing code pattern. The continued coupling of the data line 130 in regular or inverted form into Nor gates 141, 143, 145, and 147 assures non-operation of the circuitry if one of the bits is not sensed in the predetermined sequence.

Referring to FIGS. 8–10, a noise filter 149 is provided at each remote terminal and includes a pair of Nand gates 150 connected in series in the data line and each modified to include capacitors 152 and 154, respectively, connected in the "and" portion of the gate from ground to the common line between a diode 156 on one branch, a resistance 158 and supply voltage on another, and a transistor inverter 160 on a third branch.

In operation, the waveforms at points A, B, and C of the circuit of FIGS. 8 and 9 are shown in the timing diagram of FIG. 10 wherein a binary coded word 010110 in NRZ waveform is filtered to remove undesirable ambiguous fluctuations which interfere with accurate data processing. When an 0 input at A begins to go high, as at 162, the decrease in diode current is temporarily supplemented by the commencement of current flow through the resistor 158 to the capacitor until it is fully charged, thus holding the B output at 1 for the charging time of the capacitor. This eliminates fluctuations to a momentary high as at 164, while phase shifting 165 and clarifing ambiguous fluctuations to a stable high at the beginning 166 or in the middle 168 of a 1 pulse. The noise often coincides with and is partially caused by the changes in the corresponding clock pulse as at 170. Since the binary coded word is now in inverted form at B, the second capacitor 154 works in a similar manner to phase shift 171 and clarify ambiguous fluctuations to a stable low (of the non-invertd word) as at 172, while eliminating fluctuations to a momentary low (of the non-inverted word) as at 174. Since these latter fluctuations are in the form of an inverted notch of appreciable width because of the action of capacitor 152, the second capacitor must have a charging time sufficient to span the undesirable notch and thus eliminate it. In this regard, the illustrated embodiment provides for capacitor 154 to have about five times the storage capacity of capacitor 152.

As shown in FIG. 10, the resulting waveform at C is phase delayed from the waveform at A, and also is slightly elongated since the larger capacitor 154 causes the end of a pulse to undergo a greater phase delay than the beginning. But these changesin waveform are not harmful in the exemplary synchronous digital system where data is processed only during the high duty portion of a data clock signal, with the duty portion being only about one-half of the 0 or 1 pulse of the NRZ wavform. Thus a phase delay of the data signal helps by assuring that input data to flip-flops and the like will be clocked in during the stable portion of a binary pulse in NRZ waveform. More importantly, undesirable noise has been virtually eliminated from the binary coded messages.

This filter is applicable for use with any binary waveform, but is particularly useful at the remote terminals in this system where the method of decoding the biphase data is done asynchronously. This method generates unwanted noise due to the inherent time delays of all physical components in the asynchronous decoding circuit. In contrast, at the central station the decoding is done synchronously by the central decoder 82 which generates no noise. Consequently, a decoded signal in NRZ waveform must be filtered before being processed at a remote terminal, but need not be filtered before being processed at the central station.

Figure 11:
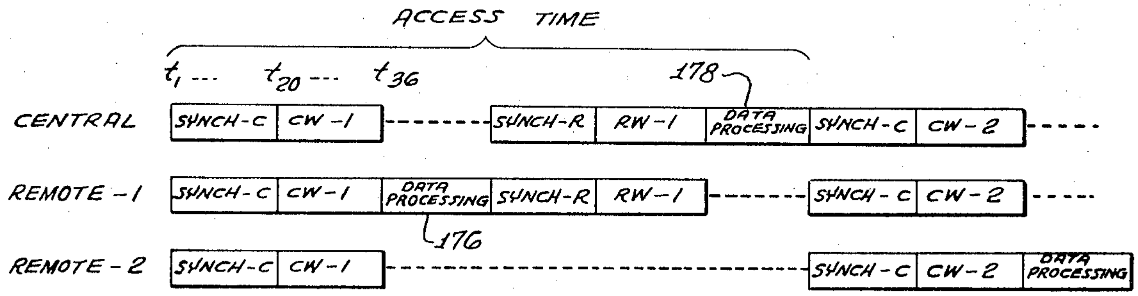
FIG. 11 is a timing diagram showing the sequence of message transmission to the central station and remote terminals of FIG. 1.

A graphical representation of the sequence of operation is shown in FIG. 11 where a binary control message comprising a pattern recognition frame SYNCH-C followed by a control word CW-1 is transmitted from the central station over the first transmission line 20 and sensed by all of the remote terminals. A period of data processing occurs during the time period 176 at the particular remote terminal to which the binary control message was addressed. This processing time is utilized to preset the word synchroniztion circuit 116 at the central station as well as preset the central decoder circuit 82. A binary response message coprising a pattern recognition frame SYNCH-R followed by a response word RW-1 is transmitted from the addressed remote terminal over the second transmission line 22 and sensed by the central station. A period of data processing now occurs during the time period 178 at the central station, during which time period the remote word synchroniztion circuits are preset to be ready for the next binary control message.

As shown in FIG. 11, the central station and/or the computer or console which controls the sequence of binary control messages delay each successive binary control message, such as the one with control word CW-2, until the previous binary response word RW-1 has been processed by the central station. This makes it possible to have time-shared transmission of the biary control messages on the first transmission line and similar time-shared transmission of the binary response messages on the second transmission line, thus providing substantial savings in material, installation and maintenance costs over conventional multiconductor cables having individual transmission wires for each parameter point.

Figure 12:
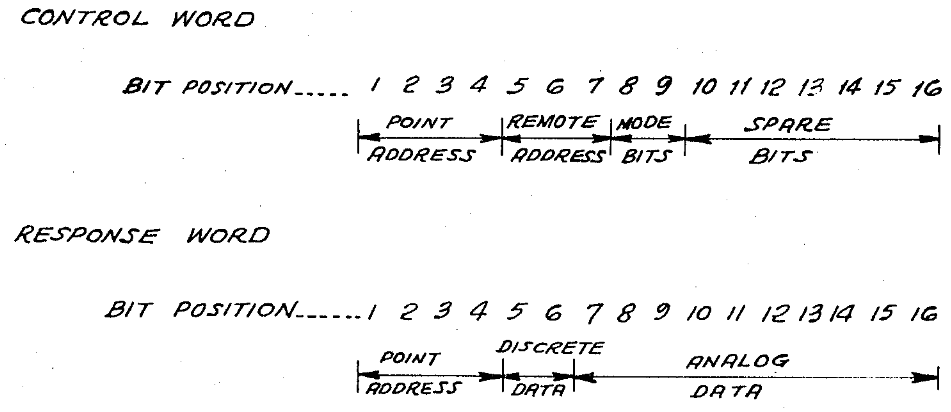
FIG. 12 shows a preferred format of a control data word for sending to a remote terminal and a response data word for sending back to a central station.

Typical control and response words exemplary of the embodiment disclosed herein are shown in FIG. 12. Referring to thecontrol word, the first four bits identify the parameter point address, the second three identify the remote terminal address, the eighth and ninth bits are mode bits for indicating to the remote terminal whether the message concerns initiating discrete or analog outputs from the remote terminal or monitoring discrete or analog inputs to the remote terminal, and the last seven bits are spares for longer messages such as an analog output message converted to binary form by an A/D converter at the central station. The response word shown includes four bits to verify the identity of the point address involved, the next two bits provide discrete data and the 10 remaining bits provide analog data. Of course, at the remote stations the analog data is converted to binary form by an A/D converter, and discrete data is similarly but more easily converted to binary form, in order to take advantage of benefits resulting from transmitting all data and messages in digital form, and particularly in biphase waveform as disclosed herein. Utilization of 10 bits for analog data povided a potential of reporting over 1,000 different analog values for each analog parameter point.

Although the invention can be incorporated in a variety of commercial data transmission systems, the preferred embodiment disclosed herein has been found to be particularly useful in a system having eight remote terminals each serving 68 parameter points, making a total of 544 available parameter points. A basic bit rate of 150,000 bits per second is provided to achieve fast access time (See FIG. 11). It is therefore possible in such a system to monitor a total of 256 different dicrete input points and 128 different analog input points in the eight remote terminals in about 81 milliseconds, thereby scanning more than 4,500 points per second with an average access time of about 633 microseconds. The length of the transmission lines can be extended as necessary by providing line repeaters approximately every 1,500 feet.

Although an exemplary embodiment has been disclosed and discussed, it will be understood that other applications of the invention are possible and that the embodiments disclosed may be subjected to various additional changes, modifications and substitutions without necessarily departing from the spirit of the invention.

We claim as our invention:

1. A method of digital data transmission between a central station and a plurality of remote terminals including the steps of:

generating at the central station a binary control message, including an initial pattern recognition frame to achieve word synchronization at the remote terminals and an address frame identifying the intended destination of the binary control message;

encoding the binary control message into a biphase waveform and transmitting it to each of the remote terminals through a first transmission line;

receiving and processing the encoded control message at the remote terminals including decoding the control message and recognizing the word synchronization pattern;

generating at the addressed remote terminal a binary response message, including an initial pattern recognition frame to achieve word synchroniztion at the central station;

encoding the response message into a biphase waveform and transmitting it to the central station through a second transmission line; and receiving and processing the encoded response message at the central station including decoding the response message and recognizing the word synchronization pattern.

2. The method of claim 1 including the steps of:

generating, encoding and transmitting a random sequence of control messages to the remote terminals;

generating, encoding and transmitting a sequence of corresponding response messages to the central station; and wherein said transmitting of said random sequence of control messages includes time-sharing said first transmission line, and said transmitting of said sequence of corresponding response messages includes time-sharing said second transmission line, each successive control message being initiated after the response message for the previous control message has been received and processed by the central station.

3. The method of claim 2 includng presetting a digital logic circuit for recognizing the word synchronization pattern at the central station and remote terminals, said presetting being accomplished at the addressed remote terminal before said receiving of the control message, and at the central station before said receiving of the response message.

4. Themethod of claim 1 including transmitting audio communications between the central station and the remote terminals through said first and second transmission lines simultaneous with said transmitting of the control message through said first transmission line and said transmitting of the response message through the second transmission line.

5. The method of claim 1 wherein said generating step at the addressed remote terminal includes generating a binary response message having a data frame with both discrete and analog data.

6. The method of claim 1 wherein said generating steps include generating control and response messages in non-return-to-zero waveform and said decoding steps include decoding control and response messages into non-return-to-zero waveform.

7. A method of transmitting a sequence of binary coded information between a central station and a plurality of remote terminals, including the steps of:

generating a binary message in non-return-to-zero waveform addressed to a particular remote terminal;

converting the binary message into a bipolar biphase waveform;

transmitting the converted binary message by differential mode through a first transmission line from the central station to the remote terminals;

processing the binary message at the addressed remote terminal and generating a binary response in non-return-t-zero waveform;

converting the binary response into a bipolar biphase waveform;

transmitting the converted binary response by differential mode through a second transmission line from the addressed remote terminal to the central station;

processing the binary response at the central station;

wherein word synchronization at the central station and the remote terminals is achieved by recognizing an initial frame pattern in the binary message and response, and bit synchronization for the binary message is achieved at the remote terminals by transmitting a clock signal from the central station through a third transmission line to the remote terminals and at the central station for the binary response by generating a clock signal from thebinary response itself; and further including the steps of:

generating, converting and transmitting a random sequence of binary messages and associated binary response between the central station and the remote terminals, including time-sharing said first and second transmission lines, each successive binary message being initiated after the binary response to the previous binary message has been received and processed by the central station; and intercommunicating between the central station and the remote terminals by transmitting audio messages in common mode trough two of the transmission lines without interfering with said transmitting of binary messages and responses occurring concurrently with said intercommunicating.

8. Apparatus for multiplex data transmission of binary messages between a central station and a plurality of remote terminals, including in combination:

means in said central station for generating binary control messages addressed to specific remote terminals;

first transformer circuit means connecting said central station to each of said remote terminals for converting said binary control messages into bipolar biphase baseband signals and for transmitting said baseband signals in differential mode to said remote terminals;

means in said remote terminals connected to said first transformer circuit means for receiving and processing said binary control messages and for generating binary response messages, said binary response messages being generated in each instance by the specific remote terminal to which the individual binary control message is addressed; and second transformer circuit means connecting said remote terminals to said central station for converting said binary response messages into bipolar biphase baseband signals and for transmitting said baseband signals in differential mode to said central station for processing before another binary control message is generated.

9. The apparatus of claim 8 including :

means in said central station for generating a clock signal corresponding to said binary control message; and third transformer circuit means connecting said central station to each of said remote terminals for converting said clock signal into a bipolar baseband signal and for transmitting said baseband signal in differential mode to said remote terminals.

10. The apparatus of claim 8 which includes means for audio communication between said central station and said remote terminals including audio circuit means connecting said central station and individual remote terminals to opposite ends of said first and second transformer circuit means for transmitting audio communications in common mode on said first and second transformer circuit means without interfering with their concurrent transmission of bipolar biphase baseband signals in differential mode.

11. The apparatus of claim 8 which includes first synchronous digital logic circuit means at said central station connected to said second transformer circuit means and at each of said remote terminals connected to said first transformer circuit means for recognizing a predetermined pattern in the initial frame of said binary control and response messages to achieve word synchronization at said central station and said remote terminals before processing said binary control and response messages.

12. The apparatus of claim 8 which includes second synchronous digital logic circuit means at said central station connected to said second transformer circuit means for decoding said binary response message from biphase waveform to non-return-to-zero waveform and for generating a corresponding clock signal.

13. The apparatus of claim 8 which includes circuit means at said remote terminals for filtering undesirable noise from the incoming control messages including a pair of logic gates connected in series with said first transformer circuit means with a smaller and a larger capacitor side-coupled, respectively, to each of said pair of logic gates.

14. Apparatus for multiplex data transmission of binary messages between a central station and a plurality of remote terminals, including in combination:

means in said central station for generating binary control messages addressed to specific remote terminals;

first transformer circuit means connecting said central station to each of said remote terminals for converting said binary control messages into bipolar biphase baseband signals and for transmitting said base-band signals in differential mode to said remote terminals;

means in said remote terminals connected to said first transformer circuit means for receiving and processing said binary control messages, including logic gate means for filtering noise and removing ambiguous fluctuations from said binary control messages and including a pattern recognition circuit means for achieving word synchronization, and for generating binary response messages, said binary response messages being generated in each instance by the specific remote terminal to which the individual binary control message is addressed;

second transformer circuit means connecting said remote terminals to said central station for converting said binary response messages into bipolar biphase baseband signals and for transmitting said baseband signals in differential mode to said central station;

means in said central station for generating a clock signal corresponding to said binary control messages;

third transformer circuit means connecting said central station to each of said remote terminals for converting said clock signal into a bipolar baseband signal and for transmitting said baseband signal in differential mode to said remote terminals; and audio circuit means connecting said central station and individual remote terminals to two of said transformer circuit means for transmitting audio communications in common mode between said central station and said remote terminals on said two transformer circuit means without interfering with the concurrent transmission of bipolar biphase baseband signals in differential mode; and wherein said central station includes synchronous digital logic circuit means connected to said second transformer circuit means for decoding said binary response messages from biphase waveform to non-return-to-zero waveform and for generating a corresponding clock signal to enable said central station to process each binary response message before generating another binary control message.

* * * * *

UNITED STATES PATENT OFFICE
CERTIFICATE OF CORRECTION

Patent No. 3,747,067 Dated July 17, 1973

Inventor(s) Duane C. Fox et al.

It is certified that error appears in the above-identified patent and that said Letters Patent are hereby corrected as shown below:

Column 2, line 13 - after "incorporating" insert "a"

Column 3, line 61 - "substantialy" should be "substantially"

Column 4, line 29 - "4" should be "46"

Column 5, line 21 - "cnnected" should be "connected"

Column 7, line 66 - "coprising" should be "comprising"

Column 8, line 5 - "synchroniztion" should be "synchronization"

Column 8, line 13 - "biary" should be "binary"

Column 8, lines 43 and 44 - "povided" should be "provides"

Column 9, line 45 - "includng" should be "including"

Column 9, line 52 - "Themethod" should be "The method"

Column 10, line 14- "return-t-zero" should be "return-to-zero"

Column 10, line 30- "thebinary" should be "the binary"

Column 10, line 35- "response" should be "responses"

Column 10, line 44- "trough" should be "through"

Page 6 in Orig. Patent - Assignee should read "American Multiplex Systems, Inc"

Signed and sealed this 18th day of December 1973.

(SEAL)
Attest:

EDWARD M. FLETCHER, JR.
Attesting Officer

RENE D. TEGTMEYER
Acting Commissioner of Patent